(No Model.)
W. M. SHELTON.
BREAD RAISER.
No. 420,110. Patented Jan. 28, 1890.
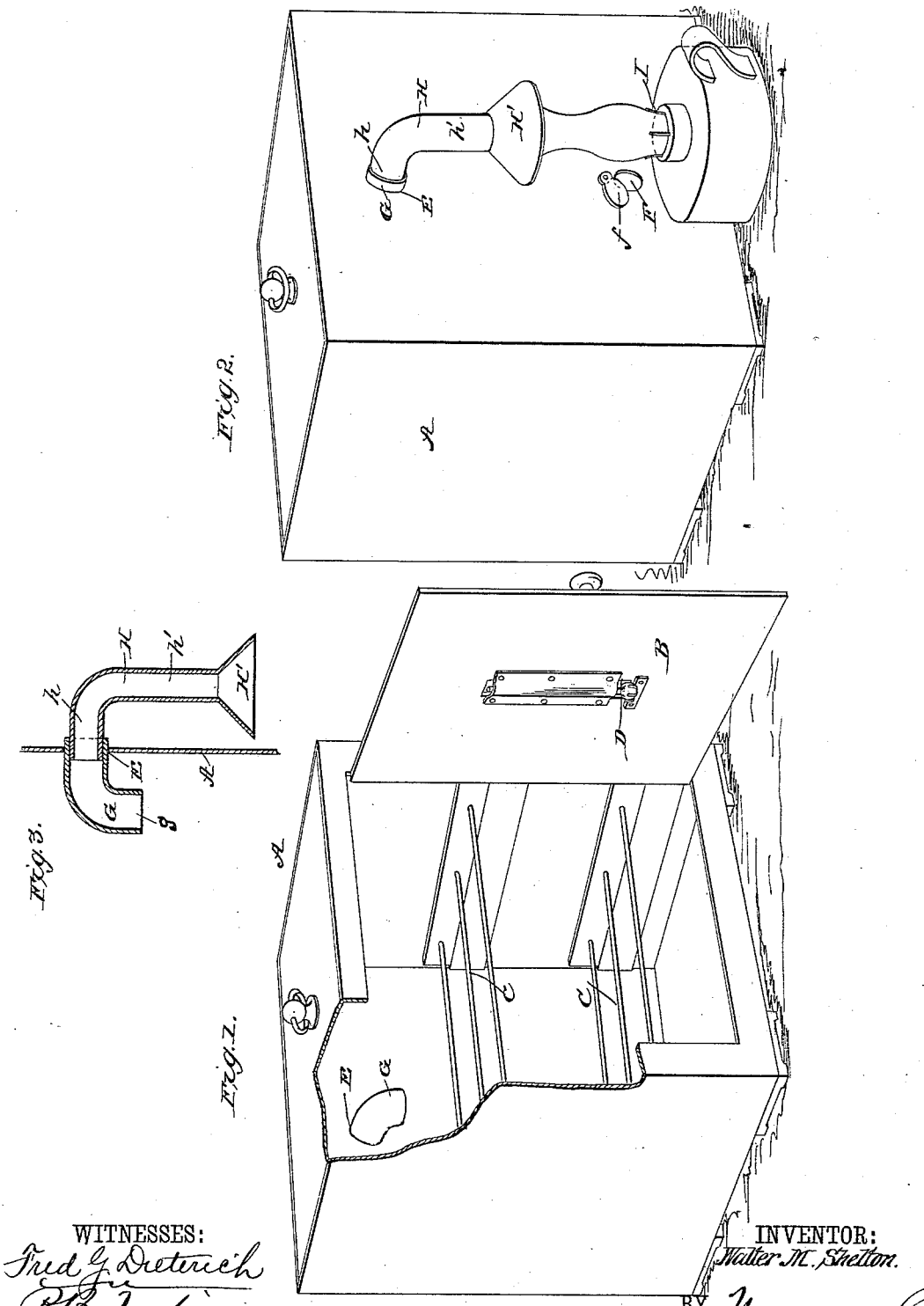
WITNESSES:
Fred G. Dieterich
P. B. Turpin
INVENTOR:
Walter M. Shelton.
BY
Munn & Co
ATTORNEYS.

UNITED STATES PATENT OFFICE.

WALTER MITCHELL SHELTON, OF ATLEE'S, VIRGINIA.

BREAD-RAISER.

SPECIFICATION forming part of Letters Patent No. 420,110, dated January 28, 1890.

Application filed January 23, 1888. Serial No. 261,688. (No model.)

*To all whom it may concern:*

Be it known that I, WALTER MITCHELL SHELTON, of Atlee's, in the county of Hanover, State of Virginia, have invented a certain Improvement in Bread-Raisers, of which the following is a specification.

My invention is an improvement in devices for warming dough to cause the same to rise preparatory to baking; and its object is to provide a bread-raising oven so constructed that warm gases can be continuously circulated through the oven and the comparatively-cool outgoing gases partially mixed with freshly-heated ingoing gases, the ascensional force of which is utilized to inject the mixture into the inlet-pipe; and the invention consists in the device herein described and particularly pointed out.

In the drawings, Figure 1 is a perspective view of the front of the apparatus, the door being open and parts broken away and others shown in section. Fig. 2 is a perspective view of the rear side of the apparatus, and Fig. 3 is a sectional view of the inlet-pipes.

The oven, box, or case A may be of any suitable shape or material, but is preferably rectangular and made of tin. It is provided with a door B, through which vessels containing the dough may be inserted and removed, and contains a rack or racks C for supporting such vessel. The door B is also preferably provided with a thermometer D to indicate the temperature within the oven. At a point near its top, and preferably in its back or rear side, the oven has an inlet E for heated gases, while near its bottom it is provided with an outlet or discharge F, preferably controlled by a valve S, as shown. The outlet F is in a line vertically below the opening E, this arrangement being important, as will be presently described. The heat-conducting or gas-inlet pipe is formed in sections, the inner one G of which fits in the opening E and has a depending portion, by which the heated gases are deflected downward and away from or beside the shelf which supports the vessel containing the dough. The outer section H has a horizontal arm $h$, which fits within the section G. These sections may be applied or removed at will, and when detached they may be placed in the oven. The section H is provided at the lower end of its vertical arm $h'$ with a funnel or collector H'. This open end of pipe H is made larger than the lamp-chimney, in order that gases or air ascending in contact with the exterior of the chimney may pass into the pipe. As shown, it is arranged sufficiently high to permit a lamp to be placed beneath it, and it is an incident of this use of a lamp that both its lighting and heating capacity may be utilized, though it is obvious that a heating device that emitted no light would act in substantially the same manner to warm the interior of the oven.

It will be seen that according to my improvement the exit for gases from the oven is placed below the inlet and on the same end or side therewith, and that the inlet-pipe is provided with an enlarged end adapted to receive beneath it a lamp or other source of heat. Said lamp, by heating the surrounding atmosphere and producing upward currents, acts to promote a draft from the oven-exit, such draft being desirable to overcome the levity of the warm gases within the oven, and, further, the highly-heated and rarefied products of combustion within the lamp-chimney, rising rapidly into the open-mouthed pipe placed immediately above it, acts as an injector to force into said pipe a considerable part of the partially-cooled gases drawn, as above stated, from the oven, which are thus carried back into the same, the relatively-cool gases from the exit mixing with the freshly-heated products from the chimney and moderating their temperature. By this construction a small quantity of fuel can be made to economically and uniformly warm an oven filled with dough sufficiently to cause the same to rise. The warm gases are in part passed repeatedly through the oven, and are so mixed with the fresh hot products as to temper their excessive heat, and, further, these mixed gases are so directed by the heat-inlet pipe that they will not impinge directly upon the dough placed upon the shelves.

I am aware that ovens and drying-chambers have been provided with means for introducing hot gases at the upper part thereof, said gases being allowed to escape at a lower point, and also that devices for injecting air into burners or into flues to be conducted to burners to supply combustion, and also that lamps and gas-burners, have been utilized to afford heat and light simultaneously, and such matters are not of my invention.

Having thus described my invention, what I desire to secure by Letters Patent is as follows:

1. An oven having an inlet-pipe for hot gases near its top, provided with a downwardly-extended mouth and having an exit-opening in the same side thereof, said exit being located below the inlet-mouth of the inlet, all substantially as set forth, whereby it is adapted to be used with a lamp or similar heating device to circulate heated gases continuously.

2. An oven having an inlet-pipe in its upper part, provided with an external downwardly-opening mouth and with an exit-opening directly below said inlet, in combination with a conduit for hot products of combustion—such as a lamp-chimney—said chimney being of less diameter than the mouth of the pipe, substantially as set forth.

3. An oven having an inlet-pipe in its upper part, composed of inner and outer downwardly-bent sections, the outer section being located above an exit-opening and over a conduit of hot gases—such as a lamp-chimney—but not closely embracing the same, substantially as set forth.

WALTER MITCHELL SHELTON.

Witnesses:
GEO. P. HAW,
W. M. JUSTIS, Jr.